United States Patent [19]

Kress

[11] 4,077,282

[45] Mar. 7, 1978

[54] TRANSMISSION

[75] Inventor: James Henry Kress, Cedar Falls, Iowa

[73] Assignee: Deere & Company, Moline, Ill.

[21] Appl. No.: 753,644

[22] Filed: Dec. 23, 1976

[51] Int. Cl.² .............................................. F16H 57/10
[52] U.S. Cl. ........................................ 74/760; 74/761
[58] Field of Search ........................ 74/760, 761, 753

[56] References Cited

U.S. PATENT DOCUMENTS

| | | | |
|---|---|---|---|
| 1,217,059 | 2/1917 | Pollard | 74/761 |
| 2,220,174 | 11/1940 | Ravigneaux | 74/760 X |
| 2,598,179 | 5/1952 | Kelbel | 74/761 |
| 2,657,592 | 11/1953 | Burnett | 74/760 X |
| 2,689,490 | 9/1954 | Holdeman | 74/761 |
| 2,770,151 | 11/1956 | Cartwright et al. | 74/761 X |
| 2,901,923 | 9/1959 | Waclawek | 74/761 X |
| 3,721,135 | 3/1973 | Kelley | 74/761 |

*Primary Examiner*—Samuel Scott
*Assistant Examiner*—Lance W. Chandler

[57] ABSTRACT

A planetary transmission for selectively shifting among three forward and one reverse speeds includes first and second sun gears respectively secured to and clutchable to a drive shaft to provide a first forward speed. A planet carrier, secured to a driven shaft, surrounds the sun gears and carries a first planet gear meshing with the first sun gear and a compound planet gear comprising a second planet gear meshing with the first planet gear and a third planet gear meshing with the second sun gear. Respectively concentric with the first and second sun gears are brake-associated first and second ring gears which respectively mesh with the first and third planet gears. First, second, and third brakes are respectively connected to the first ring gear, the second ring gear, and the first sun gear to stop and allow rotation of said gears to provide two forward and one reverse speeds; a third forward speed is provided by clutching the second sun gear to the drive shaft.

9 Claims, 2 Drawing Figures

TRANSMISSION

BACKGROUND OF THE INVENTION

The present invention relates generally to vehicle power shift transmissions and more particularly to a planetary transmission which is capable of being shifted between three forward and one reverse speeds.

In the past, a number of different planetary transmission arrangements have been developed to provide various speed ratios as exemplified by the U.S. Pat. No. 2,697,367 granted to M. P. Winther which provides four forward and one reverse speeds with three brakes and two clutches. The ultimate aim of these arrangements has been to provide a maximum number of speed ratios with a minimum number of control elements such as brakes and clutches.

SUMMARY OF THE INVENTION

The present invention provides a three forward and one reverse speed planetary transmission requiring a minimum number of gears, brakes, and clutches. A drive shaft is provided with a sun gear for driving a planet gear journaled in a planet carrier secured to a driven shaft. The planet gear is selectively rotated to drive the planet carrier by meshing with a compound planet gear which meshes with brake-associated sun and first ring gears and by meshing with a brake-associated second ring gear. The planet gear is selectively prevented from rotating to provide a direct drive from the input to the output shafts by clutching the input shaft to the brake-associated sun gear.

DESCRIPTION OF THE PREFERRED EMBODIMENT

Figure 1:
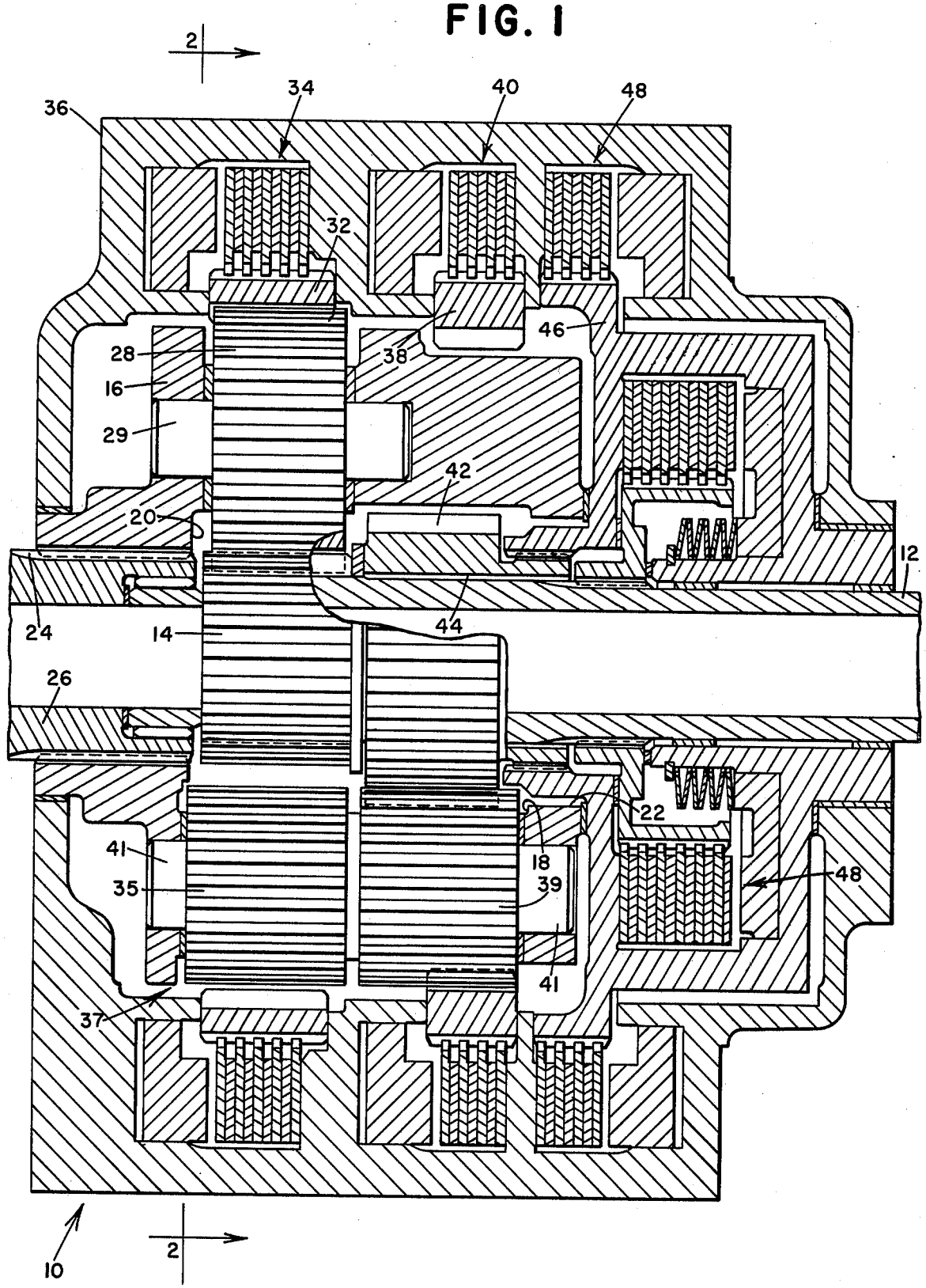
FIG. 1 is a diagrammatic longitudinal view, partially in section, of the planetary transmission of the present invention.

Referring now to FIG. 1, therein is shown a planetary transmission generally designated by the numeral 10. The transmission 10 is driven by a drive shaft 12 which is generally connected to an internal combustion engine (not shown). The drive shaft 12 includes a first sun gear 14 integral therewith at the rear end of the input shaft 12. The expression "rear end" is used on the basis of a typical fore and aft disposition of the transmission in a vehicle; however, it will be realized that such expressions are used solely for purposes of convenience and not by way of limitation.

The first sun gear 14 is disposed within a planet carrier generally designated by the numeral 16 which has front and rear walls 18 and 20, respectively. The front wall 18 has an opening 22 and the rear wall is splined at 24 to a driven shaft 26. The carrier 16 has means rigidly interconnecting the front and rear wall 18 and 20, and this means includes several shafts, for carrying planet gears to be hereinafter described, together with circumferentially spaced wall portions.

Figure 2:
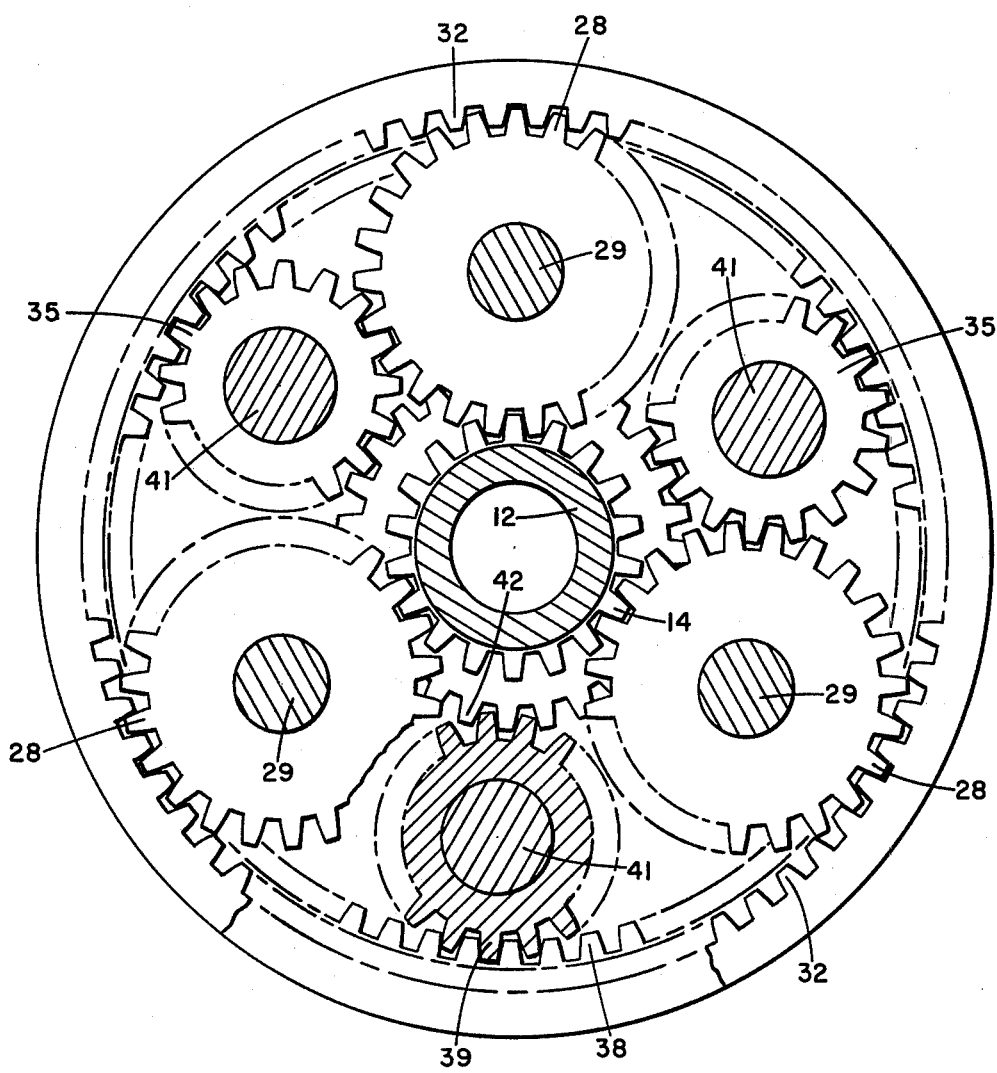
FIG. 2 is a cross-sectional view taken along the line 2—2 of FIG. 1.

The first sun gear 14 meshes with a first planet gear set 28 which consists of three gears as shown in FIG. 2 and which are mounted on a set of three equilaterally spaced first shafts 29. The first shafts 29 are rigidly secured to the planet carrier 16 so as to allow the first planet gear set 28 to protrude from the planet carrier 16 and mesh with a first ring gear 32. The first ring gear 32 concentrically encircles the first sun gear 14 and is floatingly carried by the first planet gear set 28. The first ring gear 32 is associated with a first brake 34 having conventional components which allow the first ring gear 32 to be selectively braked and released relative to a transmission housing 36.

The first planet gear set 28 meshes with a second planet gear set 35 which is a part of a compound gear set 37 which consists of three compound planet gears as shown in FIG. 2. The compound planet gear set 37 further includes a third planet gear set 39 which consists of three gears as shown in FIG. 2 and which are mounted on a set of three equilaterally spaced second shafts 41. The second shaft set 41 is rigidly secured to the planet carrier 16 and positioned so as to allow the third planet gear set 39 to protrude therefrom and engage a second ring gear 38. The second ring gear 38 concentrically encircles the input shaft 12 and is floatingly carried by the third planet gear set 39. A second brake 40 is associated with the second ring gear 38 and has conventional components for selectively braking and releasing the second ring gear 38 relative to the transmission housing 36.

A second sun gear 42 having an aperture 44 encircles the drive shaft 12 forwardly of the first sun gear 14 and meshes with the third planet gear 39. The second sun gear 42 has a concentric plate 46 splined thereto which has a second brake 48 secured to its outer periphery for selectively braking and releasing the second sun gear 42 relative to the transmission housing 36. Medially positioned on the plate 46 is a clutch 48 for selectively coupling the second sun gear 42 to the drive shaft 12 forwardly of the planet carrier 16.

From the description thus far and noting that the drive shaft 12 may be connected to a power source such as an internal combustion engine by clutch or other torque transmitting mechanism, it will be seen that the drive shaft 12 may be regarded as a constantly rotating part.

A first forward speed is obtained by braking the first brake 34. The rotation of the drive shaft 12 is transmitted through the first sun gear 14 to the first planet gear set 28 causing rotation thereof. The rotation of the first planet gear set 28 causes translation thereof due to its meshing with the braked first ring gear 32. The translation of the first planet gear set 28 causes rotation of the planet carrier 16 and thus of the driven shaft 26.

A second forward speed is obtained by braking the third brake 48. The rotation of the drive shaft 12 is transmitted the first sun gear 14 to the first planet gear set 28 which causes the compound gear set 37 to rotate. Since the third planet gear set 39 meshes with the braked second sun gear 42, the compound gear set 37 rotates and translates. The translation of the compound gear set 37 causes rotation of the planet carrier 16 and thus the rotation of the driven shaft 26 at a second forward speed.

A third forward speed is obtained by engaging the clutch 48 to couple the second sun gear 42 to the drive shaft 12. With the second sun gear 42 held in a fixed relation to the first sun gear 14, the first planet gear 28 and the compound planet gear set 37 are prevented from rotating and thus are forced to translate due to the engagements of said gears with the first and second sun gears 14 and 42 so as to provide a direct mechanical drive from the drive shaft 12 to the driven shaft 26.

A reverse speed is obtained by braking the second brake 40. The rotation of the drive shaft 12 is transmitted through the first sun gear 14 to the first planet gear set 28 to cause rotation of the compound planet gear set 37. Since the third planet gear set 39 of the compound planet gear set 37 engages with the braked second ring gear 38 the compound planet gear set 37 is forced to translate in a direction exactly the opposite from the drive direction. A reverse translation of the compound planet gear set 37 is transmitted to the planet carrier 16 and thus to the driven shaft 26 to provide the reverse speed.

Therefore, there has been presented a planetary transmission 10 capable of providing three forward and one reverse speeds with three brakes and one clutch. As evident to those skilled in the art, the number of teeth selected for each of the gears is chosen so as to provide three different, desired forward speed ratios.

While the invention has been described in conjunction with a specific embodiment, it is to be understood that many alternatives, modifications, and variations will be apparent to those skilled in the art in light of the aforegoing description. Accordingly, it is intended to embrace all such alternatives, modifications, and variations which fall within the spirit and scope of the appended claims.

I claim:

1. A transmission comprising: a drive shaft; a driven shaft; first and second planetary units having a rotatable planet carrier secured to the driven shaft; said first planetary unit including a first rotatable ring gear, a first sun gear integral with the drive shaft and concentric with the first ring gear, a first planet gear journaled in the planet carrier meshing with the first sun gear and the first ring gear, and a second planet gear journaled in the planet carrier and meshing with the first planet gear; said second planetary unit including a second sun gear encircling the drive shaft, a second rotatable ring gear concentric with said second sun gear, and a third planet gear journaled in the planet carrier integral with the second planet gear and meshing with the second sun gear and the second ring gear; first, second, and third brake means for selectively braking and releasing the first ring gear, the second ring gear, and the second sun gear, respectively, whereby the driven shaft is rotatable at two different forward and one reverse ratio with respect to the drive shaft.

2. The transmission as claimed in claim 1 including clutch means for selectively coupling and releasing the drive shaft and the second sun gear whereby the driven shaft is rotatable at an additional different forward ratio.

3. The transmission as claimed in claim 1 wherein the drive shaft, the planet carrier, and the driven shaft are coaxial on a fore and aft axis, the second planetary unit is coaxially forwardly of the first planetary unit, the second sun gear is axially hollow and includes a hollow portion with the drive shaft extending coaxially therethrough, and the third brake means is connected to one end of the hollow portion of the second sun gear.

4. The transmission as claimed in claim 3 including clutch means for selectively coupling and releasing the drive shaft and the second sun gear whereby the driven shaft is rotatable at an additional different forward ratio and wherein the hollow portion of the second sun gear includes the clutch means proximate the third brake means and axially spaced forwardly of the planet carrier 5. A transmission comprising: a drive shaft; a driven shaft; first and second planetary units having a rotatable planet carrier secured to the driven shaft; said first planetary unit including a first rotatable reaction gear, a first driven gear integral with drive shaft and concentric with the first reaction gear, a first planet gear journaled in the planet carrier meshing with the first driven gear and the first reaction gear, and a second planet gear journaled in the planet carrier and meshing with the first planet gear; said second planetary unit including a second driven gear encircling the drive shaft, a second rotatable reaction gear concentric with said second driven gear, and a third planet gear journaled in the planet carrier integral with the second planet gear and meshing with the second driven gear and the second reaction gear; first, second, and third brake means for selectively braking and releasing the first reaction gear, the second reaction gear, and the second driven gear respectively, whereby the driven shaft is rotatable at two different forward and one reverse ratio with respect to the drive shaft.

6. The transmission as claimed in claim 5 including clutch means for selectively coupling and releasing the drive shaft and the second driven gear whereby the driven shaft is rotatable at an additional different forward ratio.

7. The transmission as claimed in claim 5 wherein the drive shaft, the planet carrier, and the driven shaft are coaxial on a fore and aft axis, the second planetary unit is coaxially forwardly of the first planetary unit, the second driven gear is axially hollow and includes a hollow portion with the drive shaft extending coaxially therethrough, and the third brake means is connected to one end of the hollow portion of the second driven gear.

8. The transmission as claimed in claim 7 including clutch means for selectively coupling and releasing the drive shaft and the second driven gear whereby the driven shaft is rotatable at an additional different forward ratio and wherein the hollow portion of the second driven gear includes the clutch means proximate the third brake means and axially spaced forwardly of the planet carrier.

9. A planetary transmission comprising: a single planet carrier rotatable on a fore and aft axis and having spaced apart front and rear walls and means rigidly interconnecting said walls and having openings provided therein exposing the interior of said carrier outwardly; a first sun gear within the carrier just forwardly of the rear wall; a centrally apertured second sun gear coaxial with the first sun gear within the carrier just rearwardly of the front wall; first and second relatively rotatable ring gears encircling the carrier and respectively concentric with the first and second sun gears; first and second brake means for selectively braking and releasing the first and second ring gears, respectively; third brake means for selectively braking and releasing the first sun gear; a first planet gear journaled in the carrier meshing with the first sun gear and the first ring gear via at least one of the aforesaid openings; a second planet gear meshing with the first planet gear; a third planet gear journaled in the carrier integral with the second planet gear and meshing with the second sun gear and the second ring gear via at least one of the aforesaid openings; a drive shaft extending through the carrier front wall and integral with the first sun gear; clutch means having a hollow portion extending through the carrier front wall and secured to the second sun gear for selectively coupling the second sun gear to the drive shaft; and a driven shaft secured to the carrier rear wall and extending rearwardly therefrom.

* * * * *